United States Patent
Henn et al.

(10) Patent No.: US 11,319,245 B2
(45) Date of Patent: May 3, 2022

(54) COATED PROTECTIVE GLAZING

(71) Applicant: SCHOTT AG, Mainz (DE)

(72) Inventors: Christian Henn, Frei-Laubersheim (DE); Eveline Rudigier-Voigt, Mainz (DE); Lutz Klippe, Wiesbaden (DE); Daniel Köhler, Büdingen (DE)

(73) Assignee: SCHOTT AG, Mainz (DE)

( * ) Notice: Subject to any disclaimer, the term of this patent is extended or adjusted under 35 U.S.C. 154(b) by 409 days.

(21) Appl. No.: 15/890,478

(22) Filed: Feb. 7, 2018

(65) Prior Publication Data

US 2018/0222794 A1    Aug. 9, 2018

(30) Foreign Application Priority Data

Feb. 7, 2017  (DE) .......................... 102017102377.1

(51) Int. Cl.
*B32B 17/06* (2006.01)
*C03C 17/34* (2006.01)
*C03C 17/00* (2006.01)
*F24C 15/00* (2006.01)

(52) U.S. Cl.
CPC ........ *C03C 17/3435* (2013.01); *C03C 17/002* (2013.01); *C03C 17/3411* (2013.01); *F24C 15/005* (2013.01); *C03C 2217/214* (2013.01); *C03C 2217/216* (2013.01); *C03C 2217/24* (2013.01); *C03C 2217/281* (2013.01); *C03C 2217/72* (2013.01); *C03C 2217/78* (2013.01); *C03C 2217/944* (2013.01); *C03C 2218/156* (2013.01)

(58) Field of Classification Search
CPC ...................... C03C 2217/216; C03C 2217/24
USPC ............................. 428/426, 428, 432, 688
See application file for complete search history.

(56) References Cited

U.S. PATENT DOCUMENTS

| | | | |
|---|---|---|---|
| 5,070,230 A * | 12/1991 | Osada ............... | B32B 17/10036 219/203 |
| 5,110,637 A | 5/1992 | Ando | |
| 5,447,908 A | 9/1995 | Itozaki | |
| 6,451,434 B1 | 9/2002 | Ebisawa | |
| 6,822,208 B2 * | 11/2004 | Henze ..................... | F24C 15/04 126/198 |

(Continued)

FOREIGN PATENT DOCUMENTS

| | | |
|---|---|---|
| CN | 101910082 | 12/2010 |
| DE | 68928474 | 4/1998 |

(Continued)

OTHER PUBLICATIONS

English translation of Wikipedia online, "Indiumzinnoxid", Jan. 30, 2017, 5 pages.

*Primary Examiner* — Lauren R Colgan
(74) *Attorney, Agent, or Firm* — Ohlandt, Greeley, Ruggiero & Perle, L.L.P.

(57) ABSTRACT

A protective glazing is provided that has long-term stability against degradation under high temperatures. The protective glazing includes a glass or glass ceramic pane having two opposite faces and being transparent in the visible spectral range and an infrared radiation reflecting coating on at least one of the faces. The coating includes a first layer on the face and a second layer deposited on the first layer. The first layer is a doped transparent conductive oxide and the second layer is an X-ray amorphous oxide layer or of a nitride layer.

16 Claims, 5 Drawing Sheets

(56) References Cited

U.S. PATENT DOCUMENTS

| | | | | |
|---|---|---|---|---|
| 7,294,811 B2* | 11/2007 | Kawashima | ......... | H05B 6/6402 126/200 |
| 2003/0113550 A1* | 6/2003 | Millett | ................. | A47F 3/0434 428/432 |
| 2005/0100721 A1* | 5/2005 | Dzick | ................ | C03C 17/3417 428/212 |
| 2007/0029186 A1* | 2/2007 | Krasnov | ............ | C03C 17/3435 204/192.29 |
| 2009/0320824 A1* | 12/2009 | Henn | ................ | C03C 17/3686 126/500 |
| 2010/0261009 A1 | 10/2010 | Henn | | |
| 2010/0279077 A1* | 11/2010 | Henn | .................... | C03C 17/23 428/192 |
| 2010/0282301 A1 | 11/2010 | Peter | | |
| 2010/0304090 A1* | 12/2010 | Henn | .................... | C23C 14/56 428/172 |
| 2013/0337393 A1* | 12/2013 | Henn | ................. | C03C 17/2456 432/120 |
| 2015/0146286 A1 | 5/2015 | Hagen | | |
| 2015/0279500 A1* | 10/2015 | Bellman | ................ | H01B 5/14 428/141 |
| 2015/0376056 A1 | 12/2015 | Damm | | |
| 2016/0229741 A1* | 8/2016 | Canova | ................... | C23C 14/35 |
| 2017/0114588 A1 | 4/2017 | Fukuda | | |
| 2017/0167188 A1* | 6/2017 | Burrows | ............ | C03C 17/3435 |

FOREIGN PATENT DOCUMENTS

| | | | |
|---|---|---|---|
| DE | 10342397 | | 4/2005 |
| EP | 1329307 | | 7/2003 |
| EP | 2236473 | | 10/2010 |
| EP | 2243750 | | 10/2010 |
| EP | 1503967 | | 4/2013 |
| JP | 2000229378 | | 8/2000 |
| JP | 2002308650 | | 10/2002 |
| JP | 2015512854 | | 4/2015 |
| JP | 2016517381 | | 6/2016 |
| WO | 03093185 | | 11/2003 |
| WO | WO03093185 | * | 11/2003 |
| WO | 2012036720 | | 3/2012 |
| WO | 2012041499 | | 4/2012 |
| WO | 2014058726 | | 4/2014 |
| WO | 2015190111 | | 12/2015 |

* cited by examiner

COATED PROTECTIVE GLAZING

CROSS REFERENCE TO RELATED APPLICATIONS

This application claims benefit under 35 U.S.C. 119(a) of German Patent Application No. 102017102377.1, filed Feb. 7, 2017, the entire contents of which are incorporated herein by reference.

BACKGROUND

1. Field of the Invention

The invention generally relates to protective glazing. More particularly, the invention relates to protective glazing with infrared reflecting coatings.

2. Description of Related Art

Thermal protective glazing is generally used to thermally insulate a heated space from the environment while at the same time providing a viewing window into the heated space. Besides fire-resistant glazing in the field of architecture, typical applications also include glazing for oven and fireplace viewing windows, and, more generally, oven and furnace windows.

EP 2 236 473 A1 discloses an infrared radiation reflecting glass or glass ceramic pane that has an antimony-containing tin oxide layer as the infrared reflecting coating. Such a coating is in particular distinguished by being resistant to high temperatures.

EP 2 243 750 relates to a transparent glass or glass ceramic pane which comprises a glass or glass ceramic substrate having a thermal expansion coefficient of less than $4.2*10^{-6}$/K, and a high-index single-layer reflection layer with a refractive index greater than 2.2. The single-layer reflection layer comprises $TiO_2$, $Nb_2O_5$, or $Ta_2O_5$.

WO 2012/041499 A2 discloses a heat protection glazing that includes a high-temperature infrared reflecting filter coating on a glass or glass ceramic pane with a coefficient of linear thermal expansion of less than $4.2*10^{-6}$/K. At least one surface of the glass or glass ceramic pane is coated with a titanium dioxide layer which is doped with a transition metal oxide, so that the titanium dioxide layer has a sheet resistance of at most 2 MΩ. The titanium dioxide layer has a layer thickness such that the optical thickness thereof corresponds to a quarter of the wavelength of the maximum of a black-body radiator with a temperature between 400° C. and 3000° C. Thus, the coating also has an optical interference effect for the heat radiation.

Furthermore, IR reflecting systems are known on the basis of (i) very thin (<100 nm layer thickness) metallic coatings, such as silver or gold; (ii) metal meshes; or (iii) carbon-based systems. Such systems usually have to be protected by an additional complex multilayer coating system, since they do not withstand high temperatures and, in particular, are not sufficiently heat resistant for continuous operation of an oven or fireplace, for example.

SUMMARY

The invention is based on the object to provide a protective glazing which is distinguished by very high IR reflectivity (>0.8), while at the same time exhibiting long-term stability against degradation at high temperatures (100 hours at 500° C.), and which can be implemented by a simplest possible layer structure. Thus, the invention can be applied as glazing for an oven, preferably an oven with a pyrolysis function, or for a fireplace pane, and also as fire-resistant glazing. During a pyrolysis cleaning operation, temperatures of 450° C. and above are encountered over elongated periods of time (at least 100 hours), and even more than 500° C. for a few minutes per cleaning cycle. Also, the coating should be the most neutral in color possible, and the color coordinates of the layer should vary as little as possible over the entire surface (the difference ΔE in color coordinates in the Lab color system should preferably be less than or equal to 3).

The object of the invention is surprisingly achieved according to the invention with a transparent conductive coating material which, per se, is not stable to high temperatures. The solution to the object is specified as disclosed herein.

Accordingly, the invention provides a protective glazing, in particular a thermal protective glazing, comprising a glass or glass ceramic pane having two opposite faces and being transparent in the visible spectral range, and on at least one of the faces a coating which reflects infrared radiation, the coating comprising a first layer on the face and a second layer deposited on the first layer, and wherein the first layer consists of a transparent conductive oxide (TCO, for short), preferably a doped TCO, particularly preferably a doped zinc oxide, and the second layer is an oxide layer, preferably a doped oxide layer, particularly preferably an aluminum-containing oxide layer, or wherein the second layer is a nitride layer, preferably an aluminum-containing nitride layer, most preferably a silicon aluminum nitride layer.

According to the invention, the second layer is formed as an amorphous, in particular an X-ray amorphous oxide layer or nitride layer. In the case of an X-ray amorphous layer, X-ray diffraction spectra do not have any sharp interferences clearly projecting from the average background signal, in particular not by more than 10%. Instead, diffuse interferences at small diffraction angles may occur, if any.

To produce a protective glazing according to the invention, a method is contemplated according to which a glass or glass ceramic pane is provided which has two opposite faces, and an infrared reflecting coating is applied onto at least one of the faces, by depositing a first layer using a vacuum deposition technology, preferably physical vapor deposition, most preferably sputter deposition, and by depositing a second layer onto the first layer using a vacuum deposition technology, preferably physical vapor deposition, most preferably sputter deposition, wherein the first layer that is applied is a transparent conductive layer, preferably a doped transparent conductive oxide layer, particularly preferably a transparent conductive doped zinc oxide layer, and wherein the second layer that is applied is an X-ray amorphous oxide layer, preferably a doped oxide layer, particularly preferably an aluminum-containing oxide layer, or a nitride layer is applied as the second layer. Preferably, magnetron sputtering is employed as a sputtering technology. The nitride layer as second layer is preferably X-ray amorphous as well.

Particularly preferred as the first layer is a zinc oxide layer doped with aluminum, gallium, or molybdenum. In particular aluminum is favored with regard to the likewise aluminum-containing covering second layer. It is of course possible to use two or even all three of the aforementioned dopants in combination and to have them included in the layer.

An oxide layer is suitable as the second layer, in particular an aluminum oxide layer, particularly preferably an aluminum silicate layer, in particular with an amount of silicon in a range from 0 to 95 wt % of the total mass fraction of aluminum and silicon, as $AlSiO_x$, particularly preferably with a ratio of Al to Si ranging from 60:40 to 40:60 in percent by weight.

In one particular embodiment, a pretreatment of the substrate may be performed prior to the application of the first layer. This pretreatment may either be a wet-chemical treatment or a gas phase treatment such as, for example, a plasma or corona treatment. With the pretreatment, the surface of the substrate to be coated is modified such that (i) the surface is cleaned of any contaminants, in particular organic contaminants; (ii) the surface is activated, resulting in improved adhesion; and/or (iii) the surface is selectively leached from alkalis, resulting in improved adhesion and/or prevention of diffusion of impurities into the first layer.

Doped zinc oxide layers are known to be transparent conductive layers and are used as n-doped semiconductor layers in thin-film modules that include p-n junctions, such as in solar cells, or LEDs. Especially for photovoltaic systems it is necessary that these layers exhibit high transparency. Such applications are described in more detail in WO 2014/058726 A1. However, this material is not heat resistant, and in terms of conductivity the layers degrade already at temperatures above 250° C. and particularly rapidly at temperatures above 450° C. However, especially temperatures above 400° C. are required to be able to start pyrolysis cleaning in an oven. In transparent conductive oxides, in particular in doped conductive oxides, and more particularly in doped zinc oxide layers, absorption of the free charge carriers is taking place at temperatures of 300° C. within this layer. This directly entails a strong decrease in electrical conductivity and hence reduced IR reflectivity. A hypothesis for this observation is a thermally induced formation of defect centers at the grain boundaries of the layers, where the charge carriers recombine. It has been demonstrated that the temperature stability of such layers can be increased with amorphous silicon layers, however, such a-Si layers exhibit significant absorption.

Surprisingly, for the system according to the invention it has been found that a second, covering oxide layer, in particular an aluminum-containing oxide layer can be used to stabilize the TCO layer such that the latter becomes extremely heat resistant. Thus, this second layer is effective as a protective layer. There are different hypotheses explaining this effect. On the one hand, the oxide layer is effective as a barrier against oxidation, on the other hand it is presumed that elements that are metallic for the doped layer diffuse from the covering layer into the first layer (the TCO) thereby causing a kind of post-doping. On the one hand, such post-doping introduces additional charge carriers into the TCO layer, and on the other hand, defects at the grain boundaries are annealed, resulting in lower recombination of the charge carriers in the TCO layer. This also applies in the case of cross doping, that is, if the zinc oxide layer is doped with gallium and/or molybdenum and aluminum is introduced by diffusion from the oxide layer. In this case, a decrease in the concentration of these dopants could be compensated by aluminum as a further dopant.

The embodiment of the protective glazing with a preferably X-ray amorphous nitride layer as the second layer is characterized by a nitridic barrier and in particular by improved chemical resistance compared to the oxidic barrier. Preferably, the second layer is an aluminum-containing nitride layer, more preferably a silicon-aluminum nitride layer with an amount of silicon of 0 to 95 wt % of the total mass fraction of aluminum and silicon, most preferably with 90 wt % of silicon and 10 wt % of aluminum.

It has been found that the layer design according to the invention suppresses the aforementioned mechanism of degradation and that increasing absorption of free charge carriers and therefore increased recombination of these charge carriers is not observed anymore.

The first layer preferably has a thickness in a range from 200 nm to 2 µm, more preferably between 200 and 600 nm, most preferably between 300 and 500 nm. In this way, sufficient reflectivity for thermal radiation or long-wave infrared radiation is achieved. The covering second layer may be comparatively thinner. Preferred layer thicknesses are in a range from 10 to 300 nm, more preferably from 20 to 150 nm, most preferably between 40 and 100 nm. It is presumed that in the second oxide layer or nitride layer self-passivation of the layer occurs due to the respective involved metallic element, thereby improving the barrier effect. This especially applies to aluminum oxide layers or aluminum-containing nitride layers, in particular silicon aluminum nitride layers. Self-passivation occurs to a depth of about 10 nm. Therefore, the second layer should advantageously have a thickness of at least 10 nm. Furthermore, according to one embodiment of the invention, the first layer is distinguished by preferably having a crystalline structure, particularly preferably a columnar crystalline structure with a grain size distribution from 10 to 200 nm, preferably from 20 to 150 nm, most preferably from 30 to 120 nm. The second layer preferably has an X-ray amorphous structure.

In an advantageous embodiment of the protective glazing, in order to avoid diffusion of constituents of the pane into the conductive coating and vice versa, e.g. diffusion of alkali ions, an intermediate layer is preferably applied on at least one of the faces of the glass or glass ceramic pane prior to the conductive coating, as an additional barrier coating. Accordingly, the intermediate layer is located between the conductive coating and the face of the pane.

This intermediate layer is preferably an aluminum-containing and/or silicon-containing layer, in particular with an amount of silicon of 0 to 95 wt % of the total mass fraction of aluminum and silicon, preferably an oxide layer or particularly preferably a nitride layer, in particular a silicon aluminum nitride layer.

Suitable as a glass or glass ceramic pane are, for example, glasses from the family of aluminosilicate glasses or soda-lime glasses. When soda-lime glasses are used, a silicon aluminum nitride layer with a composition range $Si_{70-95}Al_{30-5}N$ is preferred as the intermediate layer. For aluminosilicate glasses (such as Robax®) the composition range $Al_{60-90}Si_{40-10}N$ has been found to be particularly suitable.

The high temperature stability of the coating according to the invention makes it possible to perform subsequent high temperature treatment steps in the fabrication of the glazing after the infrared reflecting coating has been applied. For example, according to one embodiment of the invention it is intended to use a thermally or chemically toughened glass pane. Thermal toughening can be performed following the deposition of the infrared reflecting coating without degradation of the coating.

In case the coating is the last process step, without a thermal tempering process, the nitridic barrier exhibits better chemical resistance than the oxidic barrier.

Furthermore, in one particular embodiment, a print of ceramic inks may additionally be applied, either before or after the IR reflecting coating. The ceramic inks can then be fired at the same time with a thermal toughening process.

High temperature resistance is in particular achieved if the first layer is crystalline. By contrast, the protective effect of the second layer, in turn, is particularly good if the latter is X-ray amorphous. A combination of a crystalline first layer and an X-ray amorphous second layer is particularly preferred.

In order to achieve thermal insulation, further measures may be taken in addition to the infrared reflecting coating, such as in particular a glazing comprising a plurality of panes. Such multi-pane systems both with and without IR reflecting coating are already established on the market today. An advantage of the system according to the invention is that it allows to save panes in such a multi-pane system, so that the structural depth is significantly reduced with the same or even reduced heating of the outermost pane (facing the viewer). Accordingly, one embodiment of the invention contemplates a protective glazing comprising a second transparent pane, with the glass or glass ceramic pane arranged spaced apart from the second transparent pane such that an intermediate space is defined between the glass or glass ceramic pane and the second transparent pane.

Another advantage of the invention is that the infrared reflecting coating is well compatible with decorative ceramic ink. The decorative ceramic ink and the coating adhere firmly to each other. Therefore, according to one embodiment, a decorative pattern of decorative ceramic ink is applied on the same face on which the infrared reflecting coating is disposed. In particular, it is also possible to effect the firing of the decorative ink only after the application of the infrared reflecting coating, since the coating of the invention withstands the high temperatures during firing without substantial gradation. However, in one particular embodiment the decorative ceramic ink may as well be applied on the face facing away from the coating.

Particularly suitable as a substrate for the coating of the invention or as a glass or glass ceramic pane are glasses from the family of borosilicate glasses, aluminosilicate glasses, soda-lime glasses, glass ceramics such as lithium alumino-silicate glass ceramics, lead silicate glasses, phosphate glasses, and also crystalline glasses such as fused quartz glass or sapphire glass.

BRIEF DESCRIPTION OF THE DRAWINGS

The invention will now be described in more detail with reference to the figures, wherein.

DETAILED DESCRIPTION

Figure 1:
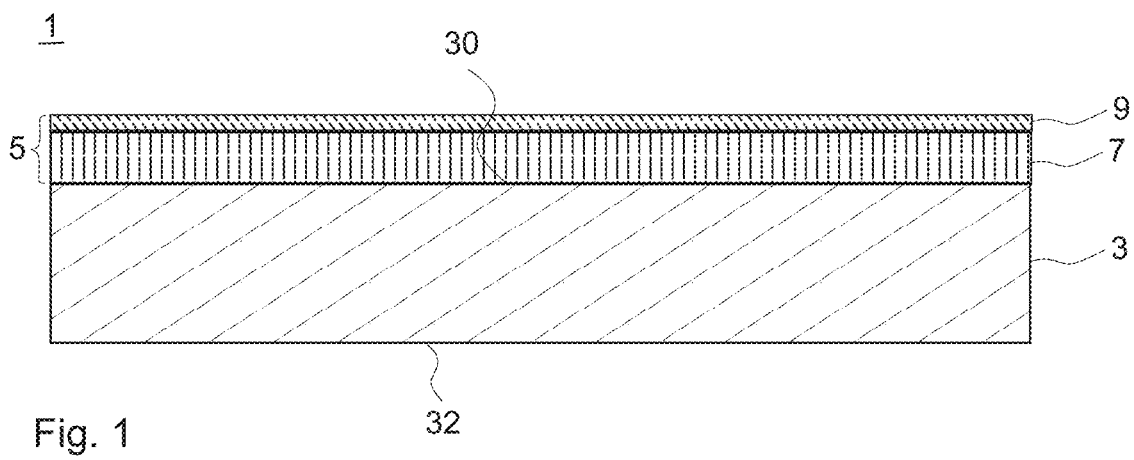
FIG. 1 is a cross-sectional view through a protective glazing with an infrared reflecting coating.

FIG. 1 shows a basic implementation of a protective glazing 1 according to the invention. Protective glazing 1 comprises a glass or glass ceramic pane 3 which is transparent in the visible spectral range and which has two opposite faces 30, 32. On face 30, an infrared reflecting coating 5 is deposited, comprising a first layer 7 and a second layer 9 covering the first layer 7 and accordingly facing outwardly. The first layer 7 consists of a transparent conductive oxide with a conductivity that has been increased due to doping, particularly preferably of zinc oxide. Dopants that are employed are metals, preferably gallium or molybdenum, but particularly preferably aluminum.

Without being limited to specific exemplary embodiments, in order to achieve a sufficient reflectivity in the infrared spectral range, the dopant content in the TCO layer is preferably between 0.2% and 10%, more preferably between 0.5% and 6%, most preferably between 0.5% and 3%. In the case of aluminum, contents of 1% and more are preferred, more preferably contents between 1% and 2%. In the case of gallium and molybdenum, contents of 1.5% and more are preferred, more preferably contents between 2% and 6%. In any case, the amount of dopant is selected such that, according to a further embodiment of the invention, the first layer has a sheet resistance between 5Ω and 50Ω, preferably between 10 and 20Ω, more preferably of not more than 17Ω. In this manner, good transparency in the visible spectral range is achieved, and at the same time high infrared reflectivity.

The second layer 9 of the coating structure may be an oxide layer, particularly preferably an aluminum oxide layer. The oxide layer does not necessarily have to be pure, i.e. need not consist exclusively of oxygen and the respective metal or semimetal. Also conceivable is a mixed oxide layer which in addition to the oxide also contains a smaller content of one or more further oxides. In particular silicatic constituents or a silicon-containing oxide layer are considered. Particularly preferred in this respect are aluminum silicate layers or silicon-containing oxide layers. Surprisingly, it has been found that an aluminum-containing layer has a very good passivation effect. This is evident by the founding that the existing conductivity of the TCO layer increases significantly after a brief temperature treatment in the absence of a second layer. In addition to the passivation effect, the second layer also has the function of an oxidation preventing layer. Without such a layer, the TCO layer or the first layer might further oxidize at high temperatures, which will in particular happen very rapidly in the presence of moisture and during the hydrolysis resulting in this case. Such oxidation leads to a rapid decrease in conductivity and hence also in reflectivity for infrared light, since due to the oxidation further defect centers are generated where the free charge carriers responsible for conductivity can recombine. However, in particular in the case of the preferred layer thickness of the second layer in a range from 20 to 150 nm, passivation is not at all something that can be taken for granted, but is actually based on the presence of metallic constituents of the reaction partner of the oxide layer, in the case of aluminum oxide particularly preferably metallic aluminum. For example, from the semiconductor industry it is known to use $SiO_2$ as a passivation layer. However, it has been found that an $SiO_2$ layer as the second layer does not have a permanent passivation effect. On the contrary, a TCO layer covered in this way rapidly degrades similarly to a non-covered TCO layer.

Alternatively, the second layer 9 of infrared reflecting coating 5 is a X-ray amorphous nitride layer, preferably an aluminum-containing nitride layer, most preferably a silicon aluminum nitride layer.

For the optical properties of the coating 5 it is furthermore generally favorable if the refractive index of the second layer 9 is smaller than the refractive index of the first layer 7. The refractive index difference with an upper low-index layer can additionally achieve an anti-reflective effect. A difference of the refractive indices of the first and second layers of at least 0.1 is preferred, more preferably a difference of at least 0.13. In a preferred embodiment, aluminum oxide as the second layer has a refractive index of about 1.7, and the TCO layer, most preferably the zinc oxide of the first layer, has a refractive index of about 1.9.

In case of a nitride layer as second layer, however, the refractive index of the second layer may be higher than the refractive index of the first layer.

Figure 10:
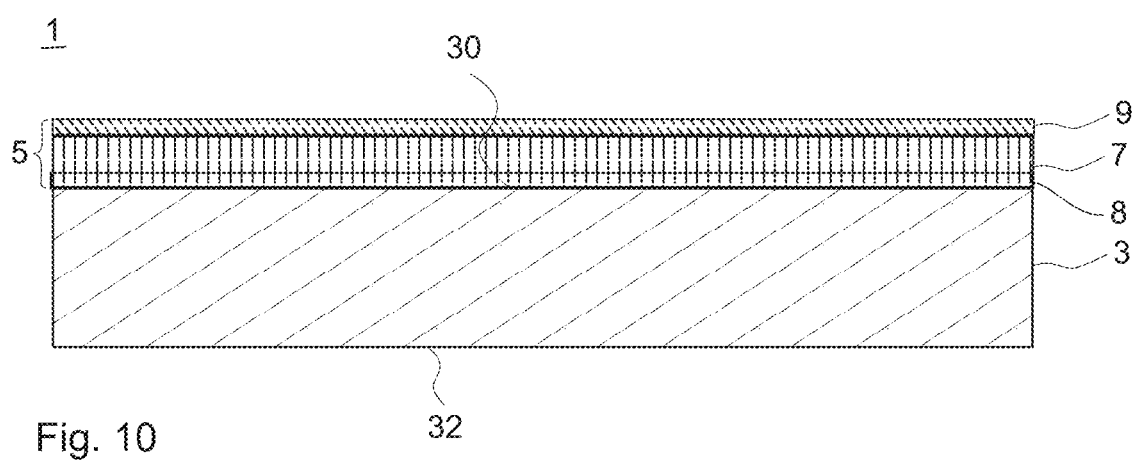
FIG. 10 shows a variant with an intermediate layer between the glass or glass ceramic pane and the infrared reflecting coating.

FIG. 10 shows a preferred refinement of the basic implementation of the invention shown in FIG. 1. Here, an intermediate layer 8 is applied on face 30 of the glass or glass ceramic pane 3, as an additional barrier coating to the infrared reflecting coating 5 thereabove comprising the first layer 7 and the second layer 9 covering the first layer 7 and hence facing outwards.

The intermediate layer 8 is preferably an aluminum-containing and/or silicon-containing layer, more preferably an oxide layer or particularly preferably a nitride layer, in particular a silicon aluminum nitride layer. The intermediate layer 8 is preferably effective as a diffusion barrier between the glass 3 and the first layer 7 of a transparent conductive oxide (TCO, for short), preferably a doped TCO, particularly preferably a doped zinc oxide. Especially in the case of a coating as the last process step, without a thermal tempering process, the nitridic barrier exhibits better chemical resistance than the oxidic barrier.

Figure 2:
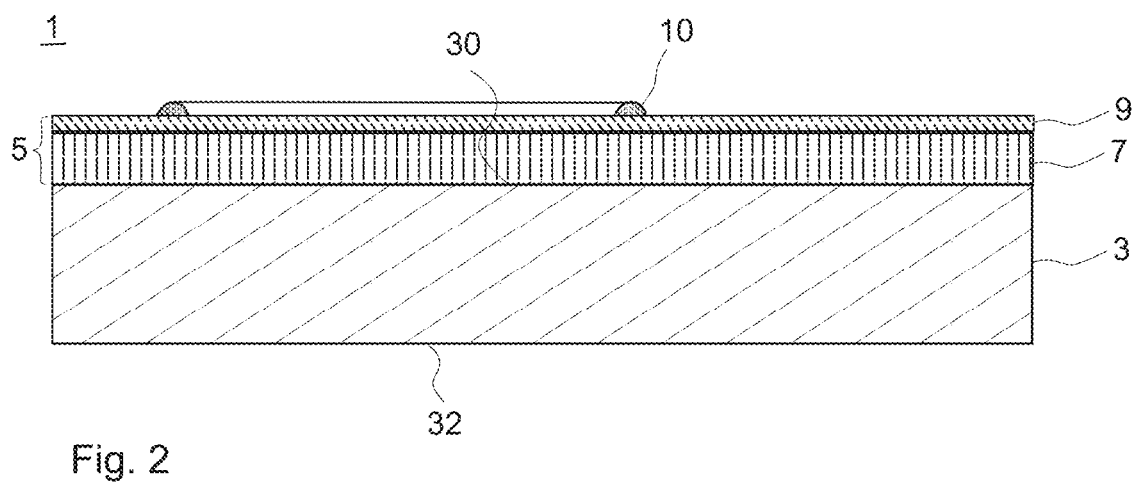
FIG. 2 shows a variant with a decorative pattern on the coating.

FIG. 2 shows a refinement of the basic implementation illustrated in FIG. 1. In this embodiment, decorative ceramic ink 10 has been applied and fired on the second layer 9 of coating 5. For example, the decorative pattern of ink 10 may represent or highlight decorative frame designs, ornaments, logos, or other graphics, such as boundaries of functional zones.

Here, the invention offers the advantage that the decorative ceramic ink 10 adheres very well on the second layer 9. The decorative ink 10 is usually applied in the form of a paste, is dried and then fired, whereby the ink sinters together to form a ceramic or ceramic-like structure. Possibly, the ceramic ink may form a composite, reaching through the coating, with the first 100 nm of the underlying glass or glass ceramic substrate and thus will have a high mechanical resistance.

According to one embodiment of the method according to the invention for producing a protective glazing 1 it is therefore contemplated that after the deposition of the coating 5, i.e. after both the first layer 7 and the second layer 9 have been applied, decorative ceramic ink 10 is applied, dried, and fired. The coating 5 also withstands the firing temperatures of temporarily at least 550° C. to 700° C. without substantial degradation. The drying may as well be part of the firing step. According to one exemplary embodiment, the decorative ink 10 is dried at 120° C. to 180° C. for 3 minutes. The subsequent firing is then accomplished at a temperature of more than 700° C., in a particular embodiment at 730° C. to 740° C. for a period of 2 to 7 min. This firing step can be combined with a thermal tempering or toughening step. More generally, without being limited to the exemplary embodiments or the view of FIG. 2, a decorative ceramic ink 10 in a pasty formulation is used, which contains one or more inorganic pigments and glass frit. The glass frit serves as a matrix for the pigment particles in the fired decorative ink 10. The pasty precursor additionally contains organic constituents.

Figure 3:
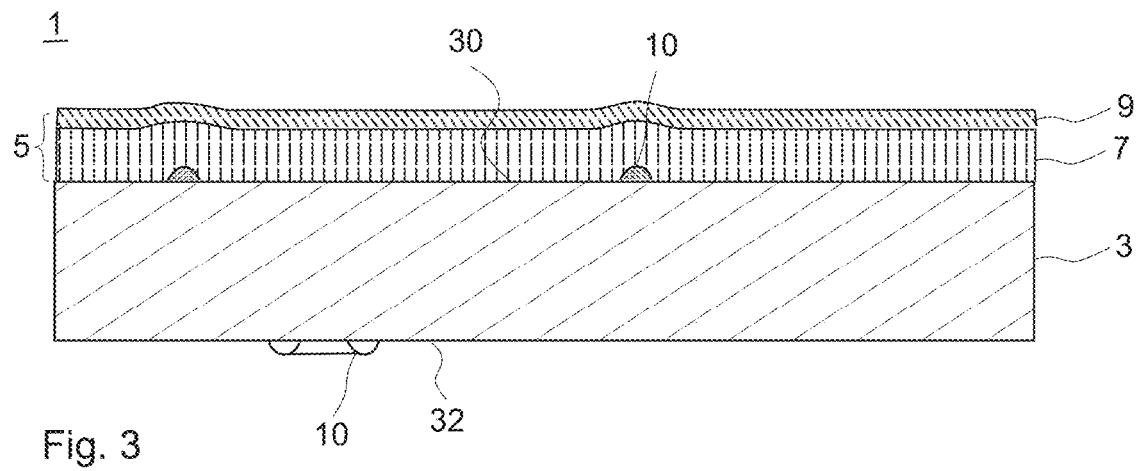
FIG. 3 shows a further variant in which the coating is deposited on the decorative pattern.

According to a further variant which is shown in FIG. 3, it is also possible to apply the decorative ceramic ink 10 before depositing the coating 5, in which case the coating 5 is deposited on the same face 30 of the glass or glass ceramic substrate that has been provided with the decorative ink 10 so that the coating 5 covers the decorative ceramic ink 10. Preferably, the decorative ink 10 is fired prior to the deposition of the coating 5, however it is also possible in this case to perform firing only after the coating has been deposited.

Finally, as is also shown in FIG. 3, it is also possible according to a further variant to apply the decorative ceramic ink 10 on a face 32 opposite to a coated face 30. This embodiment can also be combined with the embodiment shown in FIG. 2 so that both faces are decorated and the decorative pattern on a face 30 is applied on top of the coating 5. Here again, as described above, the decorative pattern can be fired prior to or after the deposition of the coating.

Figure 4:
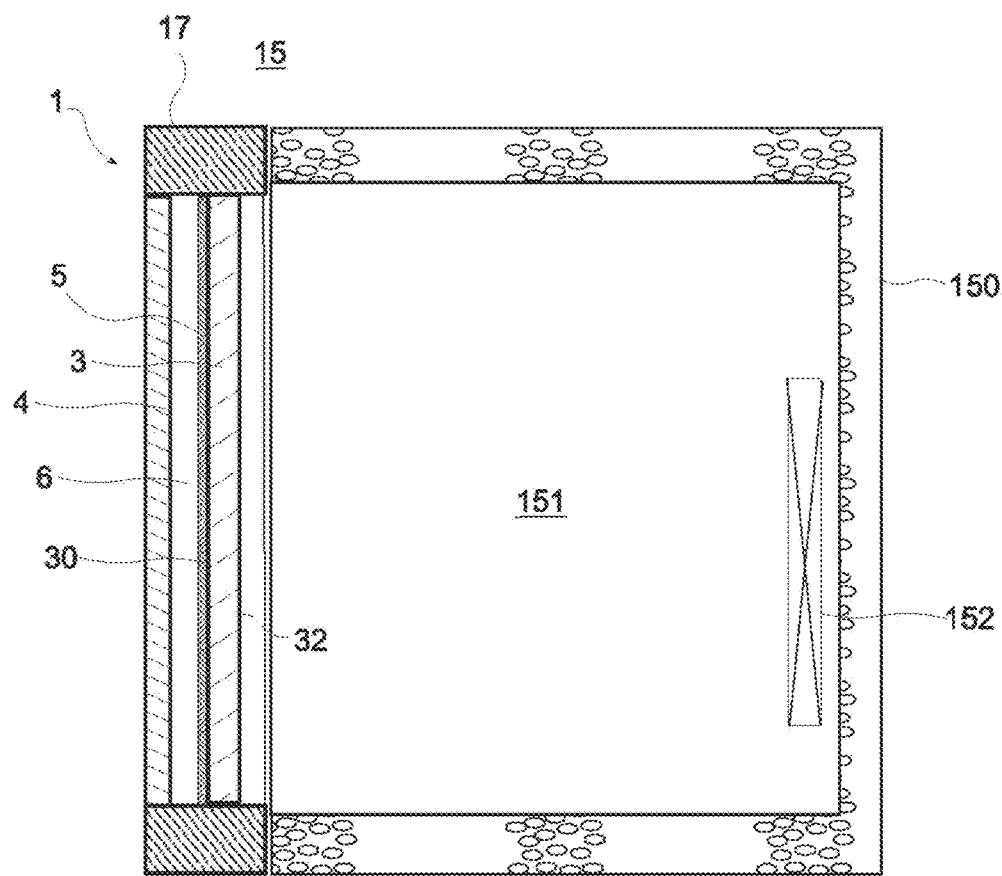
FIG. 4 shows a thermal processing unit comprising a protective glazing.

FIG. 4 illustrates a preferred application of the invention. A protective glazing 1 according to the invention is particularly useful for a thermal processing unit 15. This processing unit 15 may be a household appliance, such as an oven. Thermal processing unit 15 comprises a wall, in particular an oven muffle 150, which encloses an oven cavity 151. The oven cavity 151 is heated by one or more heating elements 152.

Protective glazing 1 provides a door 17 for the thermal processing unit 15. Unlike in the preceding basic examples of FIGS. 1 to 3, the protective glazing 1 here comprises a further transparent glass or glass ceramic pane 4. The two panes 3, 4 are preferably spaced apart from each other by an intermediate space 6. Therefore, according to one embodiment of the invention it is generally contemplated that the protective glazing 1 comprises a multi-pane glazing including at least two spaced apart panes 3, 4.

In this case, the illustrated arrangement makes sense, in which the glass or glass ceramic pane 3 facing the oven cavity is coated with the coating 5 according to the invention. Thereby, heating of the user-side second pane 4 is reduced. Moreover, there is yet another particularly advantageous feature. As already described above, one preferred application is an oven with pyrolysis cleaning function with typical heating of the oven muffle to over 450° C. In this case, the coating 5 is preferably disposed on the face 30 facing away from the oven cavity 151. Thus, the glass or glass ceramic pane 3 facing the oven cavity 151 can strongly heat up despite the coating, so that cleaning of the dirt on the pane can take place by pyrolysis. In a further embodiment, the coating is disposed on the side facing the oven cavity. In this case, heat radiation is reflected back into the oven cavity without loss, i.e. without passing through the pane, resulting in a further enhancement of the pyrolysis effect.

A further preferred use of the glazing according to the invention is a glazing of a fireplace.

Figure 5:
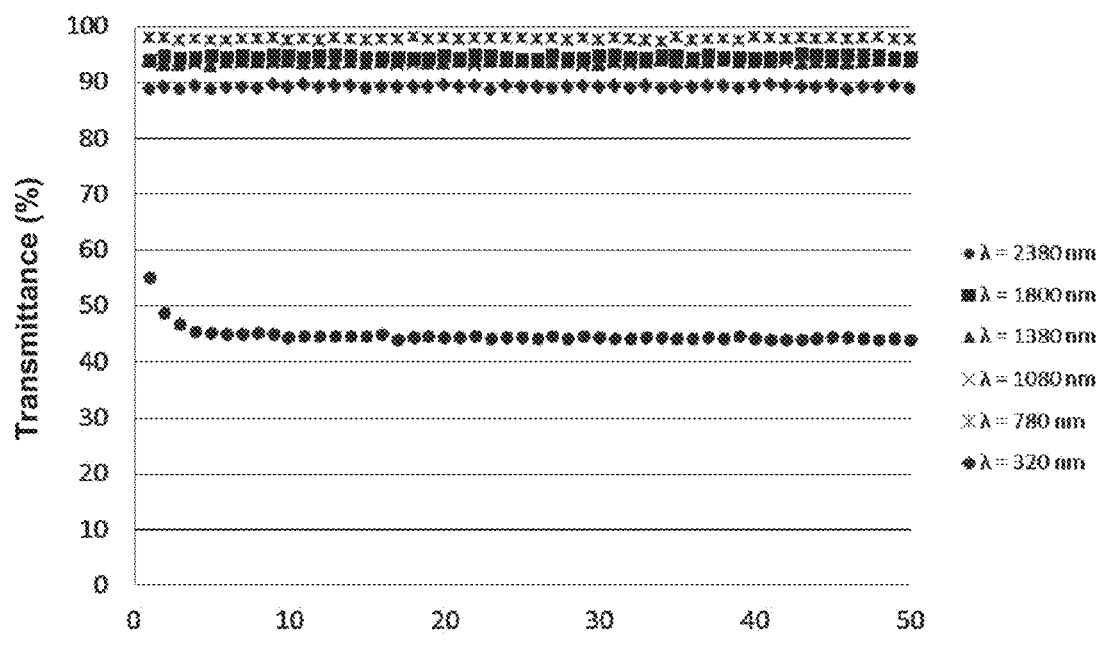
FIG. 5 is a graph of reflectance for different infrared wavelengths as a function of heating time.

The particularly high temperature resistance of a coating 5 according to the invention is illustrated with reference to FIG. 5. FIG. 5 shows measured values of light transmittance for six different wavelengths in the infrared, visible and ultraviolet spectral ranges, namely 2380 nm, 1800 nm, 1380 nm, 1080 nm, 780 nm, and 320 nm. Transmittance was monitored continuously while heating a sample in the form of a glass pane coated according to the invention. For this purpose, the sample was treated in a hot furnace at a temperature of T=740° C. Handling up to the first measuring cycle is approximately 30 s. A measuring cycle lasts approximately 65 s.

It turns out that for wavelengths λ greater than 320 nm transmittance does not change over time. Only at a wavelength of 320 nm, i.e. in the ultraviolet spectral range, transmittance decreases briefly before becoming constant from the fifth measurement cycle. This is not due to a degradation of the coating, but is based on the physical effect that in the UV range transmittance is a function of temperature. The conclusion is that no change in transmittance caused by any reactions within the layer system is observed. The layer system comprising a doped conductive first layer (TCO layer) and a covering second layer in the form of an oxide layer is therefore very stable over the long term. As is also shown in FIG. 5, the layer system has a transmittance of at least 75% in the visible spectral range. The layer system that was tested in FIG. 5 consists of a doped zinc oxide layer and an aluminum-containing oxide layer.

Figure 6:
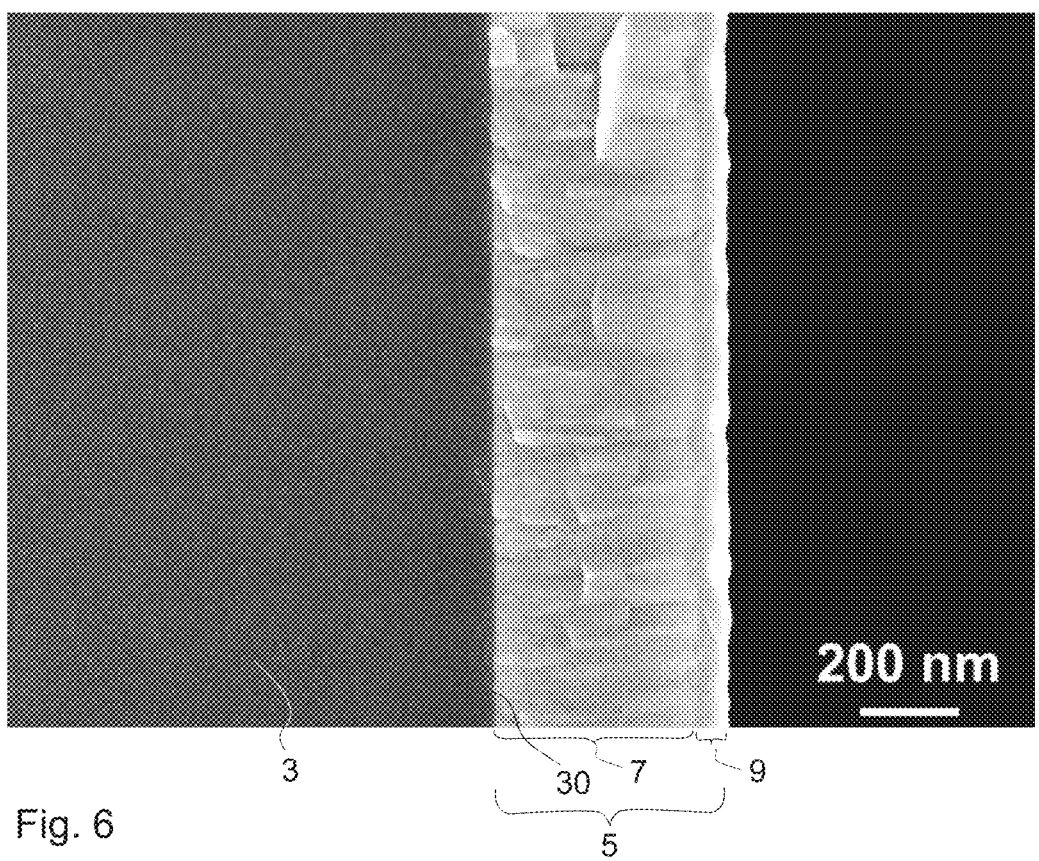
FIG. 6 shows an electron micrograph of an edge of a glass pane provided with an infrared reflecting coating.

In FIG. 6 shows an electron micrograph of the fracture edge of a glass pane 3 that was coated with an infrared reflecting coating 5 according to the invention. The first layer 7 and the second layer 9 of the coating 5 are well distinguishable from one another in the image. The first layer 7, a doped zinc oxide layer in this case, has a crystalline structure. The fracture pattern on the edge extends predominantly perpendicular to the face 30, or is oriented in the direction of the surface normal. This indicates a columnar crystalline structure. According to one embodiment of the invention, without being limited to the specific illustrated example, a first layer 7 with a columnar structure is provided, in which the longitudinal extension of the columns is substantially perpendicular to the surface of the glass or glass ceramic pane 3. The second layer 9, in the present case an aluminum-containing oxide layer, has no recognizable structures. In fact, the second layer turns out to be X-ray amorphous or at least predominantly X-ray amorphous. The amorphous morphology of the aluminum oxide layer is apparently favorable to achieve good passivation and homogeneously covers the crystalline structure of the first layer. Due to the non-structured morphology of the passivation layer, good attachment and adaptation to the structure predetermined by the TCO coating is resulting. From the scale shown in FIG. 6 it can be seen that in this embodiment the first layer 7 has a thickness of about 350 to 450 nm. The layer thickness of the aluminum oxide layer is significantly lower and amounts to about 50 to 80 nm. The total thickness of the coating 5 is thus in the preferred range between 400 and 530 nm.

Figure 7:
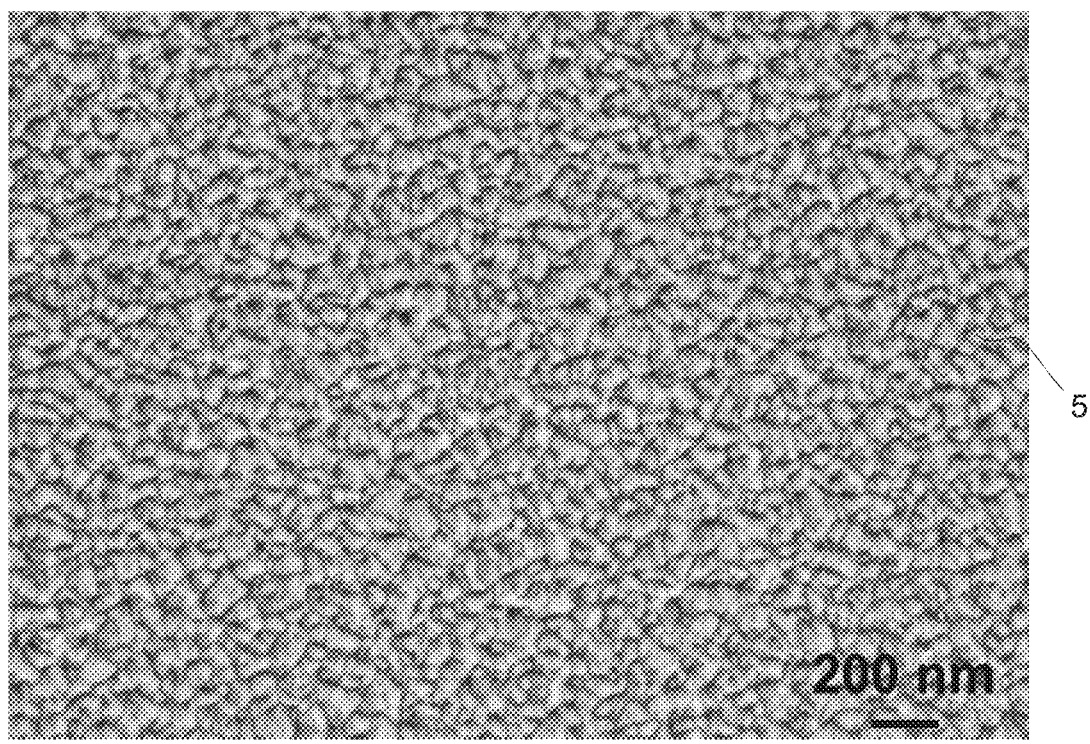
FIG. 7 shows an electron micrograph in a top view of the coating.

FIG. 7 shows, on a similar scale, an electron micrograph of the coating 5 in a top view. The columns of the columnar structure of the first layer 7 extend throughout the entire layer thickness and exhibit a broad grain size distribution between 10 and 100 nm in the top view. Moreover, it can clearly be seen that the X-ray amorphous second layer 9 merely results in a covering of the crystal structure and thus does not involve any structural change.

FIG. 5 showed the high transmittance in the visible spectral range. However, corresponding to its function, the coating 5 should exhibit high reflectance 20 for the infrared range which is relevant for heat radiation. This property will be shown below with reference to FIGS. 8 and 9.

Figure 8:
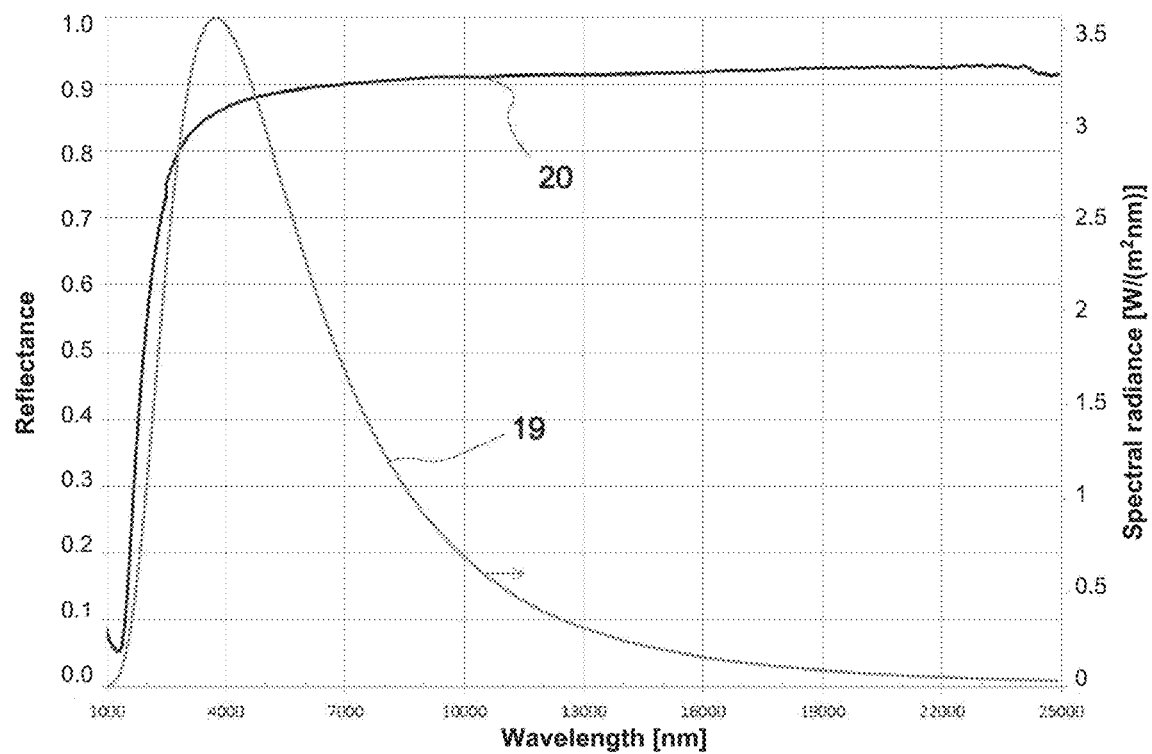
FIG. 8 is a graph of spectral reflectance of a coating in the infrared spectral range and of spectral radiance of a black body at a temperature of 500° C.

FIG. 8 shows the spectral reflectance 20 of the coating 5 in a spectral range from 1 μm to 25 μm in the state directly after the deposition of layers 7, 9. Also shown is the spectral radiance 19 of a black body at a temperature of 500° C. according to Planck's radiation formula. The function values applying for this curve are indicated on the right ordinate of the diagram. This curve approximately represents the heat radiation spectrum emitted by a hot cavity of a thermal processing unit such as, for example, the oven cavity 151 of the example of FIG. 4 at relevant operating temperatures.

In the mid-infrared range (2.5-25 μm), i.e. where radiance 19 is at a maximum at an oven temperature of 500° C., a reflectance 20 of at least 80% is achieved.

Figure 9:
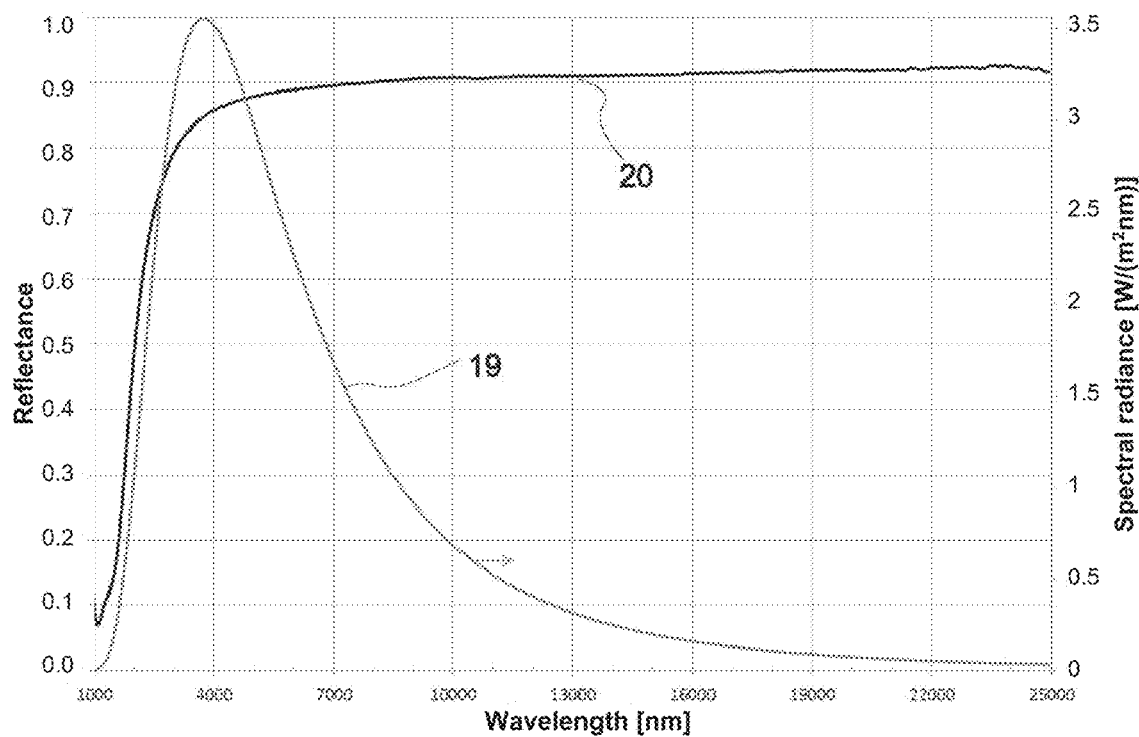
FIG. 9 is a graph corresponding to FIG. 8, for which reflectance was measured after a long-term thermal load.

The layer system can be subjected to a temperature of up to at least 740° C. without noticeable degradation in reflectance 20. For a typical operating temperature of 500° C., a continuous thermal load over 1000 h was demonstrated without causing degradation of IR reflectance. FIG. 9 shows the reflectance 20 of coating 5 after this long-term load. Moreover, coating 5 does not exhibit any visually noticeable color changes after the thermal stress tests. According to one embodiment of the invention, the color values are within in a neutral color range, both prior to and after the thermal long-term load. In the so-called Lab color system, this range is defined by values a, b each being in a range from −5 to +5, preferably in a range from −2 to +2, and by a color variation having a difference in the color values of ΔE≤3. Preferably, at least one of the values a, b remains within the range of −5 to +5. The other value may eventually have a greater or smaller value.

For optimizing the coating 5, in particular for reducing the sheet resistance and thus for increasing reflectance in the IR range, a post-treatment is preferably performed, for example a thermal post-treatment by storage in a furnace, flash lamp annealing using a xenon lamp, in particular a near-surface treatment of only the coating 5 using short-wave infrared radiation, or a laser treatment.

In contrast to known infrared reflecting layers, surprisingly, the sheet resistance of the doped first layer 7, i.e. the TCO layer, even further decreases by the thermal treatment, resulting in an increase in reflectance 20 in the IR range in a remarkable manner. Thus, the coating does not degrade, but on the contrary even exhibits improved properties. Generally, it is surprising that the passivation with the second layer 9 is so long-term stable. Also, as the temperature expansion coefficients of the layers 7, 9 are very different. If the second layer 9 is an aluminum-containing oxide layer, it has a coefficient of linear thermal expansion of $8.1*10^{-6}$/K, whereas the coefficient of linear thermal expansion of the first layer 7, in the present case doped zinc oxide, is approximately $3*10^{-6}$/K. Despite this differential, there is no cracking in the layers 7, 9, which would promote degradation. What is favorable here is that the covering oxide layer has a higher expansion coefficient than the first layer 7. Therefore, it is generally contemplated according to one embodiment of the invention that the second layer 9 has a higher coefficient of linear thermal expansion than the first layer 7.

It will be apparent to those skilled in the art that the invention is not limited to the exemplary embodiments described with reference to the figures, but rather can be varied in many ways within the scope of the claims. In particular it is possible to combine different exemplary embodiments. For example, the embodiments of FIGS. 1 to 4 and 10 each show a coating 5 on only one side. However, a double-sided coating 5 may optionally also be useful. In the case of a multi-pane glazing as shown in the example of FIG. 4, it is also conceivable to provide a respective inventive coating 5 on two panes.

LIST OF REFERENCE NUMERALS

1 Protective glazing
3, 4 Pane
5 Coating
6 Intermediate space
7 First layer
8 Intermediate layer
9 Second layer
10 Decorative ceramic ink
15 Thermal processing unit
17 Door
19 Spectral radiance
20 Reflectance
30, 32 Faces of 3
150 Oven muffle
151 Oven cavity
152 Heating element

What is claimed is:

1. A protective glazing comprising:
a glass or glass ceramic pane having two opposite faces and being transparent in the visible spectral range; and
an infrared radiation reflecting coating, the coating comprising a first layer on the glass or glass ceramic pane and a second layer deposited on the first layer,
wherein the first layer consists of a zinc oxide layer doped with aluminum, gallium or molybdenum,
wherein the second layer consists of an X-ray amorphous aluminum silicate layer or an X-ray amorphous silicon aluminum nitride layer, and
wherein the first layer is crystalline with a columnar structure, with a longitudinal extension of the column structure that is perpendicular to at least one face of the two opposite faces, and having a grain size distribution from 10 to 200 nm,
wherein the first layer has a thickness in a range from 200 to 600 nm, and
wherein the infrared radiation reflecting coating has an IR reflectance of at least 80% in the mid-infrared range between 2.5-25 µm.

2. The protective glazing of claim 1, wherein the first layer is on at least one face of the two opposite faces.

3. The protective glazing of claim 1, wherein the second layer has a thickness in a range from 10 to 300 nanometers.

4. The protective glazing of claim 1, wherein the pane is a thermally or chemically toughened glass ceramic pane.

5. The protective glazing of claim 1, further comprising a second transparent pane, wherein the glass or glass ceramic pane is arranged spaced apart from the second transparent pane such that an intermediate space is defined between the glass or glass ceramic pane and the second transparent pane.

6. The protective glazing of claim 1, further comprising a decorative pattern of decorative ceramic ink on at least one face of the two opposite faces, the first layer being on the decorative pattern.

7. The protective glazing of claim 1, wherein the first layer has a content of dopant between 0.5% weight and 6% weight and/or has a sheet resistance in a range from 10 to 20 Ω.

8. The protective glazing of claim 1, wherein the second layer has a refractive index that is smaller than a refractive index of the first layer.

9. The protective glazing of claim 1, wherein the coating has a color in a color-neutral range, with at least one of values a, b of Lab color system being in a range between −5 and +5, and with a color variation of ΔE<3.

10. The protective glazing according to claim 1,
wherein the protective glazing is configured for use as an oven door capable of withstanding a pyrolysis cleaning heating to over 450° C. at least 100 hours.

11. The protective glazing of claim 1,
wherein the glass or glass ceramic pane is a borosilicate glass pane having two opposite faces and being transparent in the visible spectral range,
wherein the first layer is on the borosilicate glass pane,
wherein the second layer is deposited on the first layer,
wherein the second layer is a silicon aluminum nitride layer, and
wherein the refractive indices of the first and second layers have a difference that is at least 0.1.

12. A thermal processing unit comprising the protective glazing according to claim 11, wherein the protective glazing is a thermal protective glazing.

13. The protective glazing of claim 1, further comprising an intermediate layer on at least one face of the two opposite faces, wherein the first layer is on the intermediate layer, and wherein the intermediate layer is an aluminum- and silicon-containing oxide layer or a silicon aluminum nitride layer.

14. A thermal processing unit comprising:
the protective glazing according to claim 1, wherein the protective glazing is a thermal protective glazing; and
a wall that encloses an oven cavity, wherein the coating is disposed on a face of the glass or glass ceramic pane away from the oven cavity.

15. The thermal processing unit of claim 14, wherein the thermal protective glazing is configured for use as an oven door capable of withstanding a pyrolysis cleaning heating to over 450° C. at least 100 hours.

16. A thermal processing unit comprising:
the protective glazing according to claim 1, wherein the protective glazing is a thermal protective glazing, and
wherein the thermal protective glazing is configured for use as a fireplace.

* * * * *